(No Model.)
J. B. SPEED.
TREATMENT OF HYDRAULIC CEMENT IN THE KILN.
No. 245,574. Patented Aug. 9, 1881.
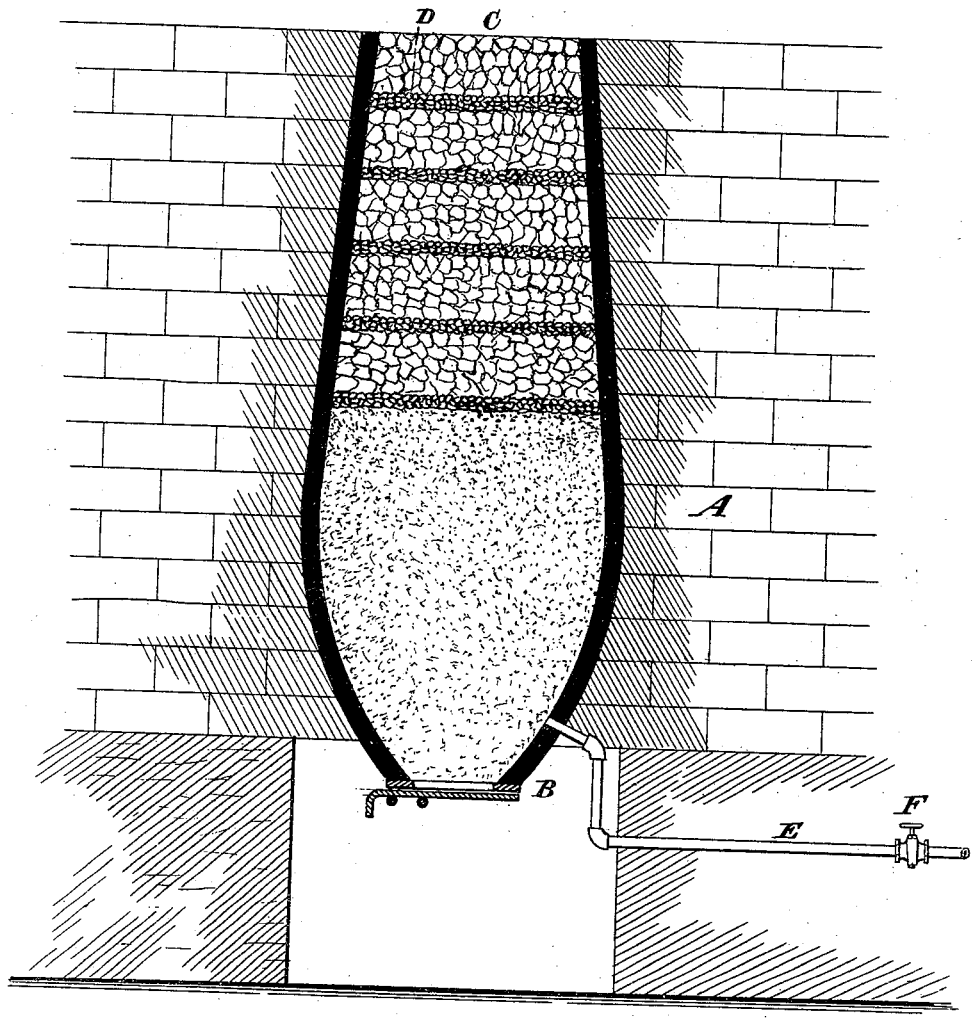
Witnesses:
A. Ruppert
C. M. Connell
J. B. Speed
Inventor.
Holloway & Blanchard
Att'ys

UNITED STATES PATENT OFFICE.

JAMES B. SPEED, OF LOUISVILLE, KENTUCKY.

TREATMENT OF HYDRAULIC CEMENT IN THE KILN.

SPECIFICATION forming part of Letters Patent No. 245,574, dated August 9, 1881.

Application filed June 27, 1881. (No model.)

*To all whom it may concern:*

Be it known that I, JAMES B. SPEED, a citizen of the United States, residing at Louisville, in the county of Jefferson and State of Kentucky, have invented a certain new and useful improvement in the treatment of hydraulic cement in the kiln in which it is burned, and thus to a great extent determining the quality thereof; and I do hereby declare the following to be a full, clear, and exact description of the invention, such as will enable others skilled in the art to which it appertains to make and use the same, reference being had to the accompanying drawing, and to the letters or figures of reference marked thereon, which form a part of this specification.

Heretofore stone or rock from which hydraulic cement has been made has been placed in layers in the kiln, such layers of stone alternating with layers of coal or other fuel, the cement being drawn from the kiln at the bottom as soon as cool enough, without further treatment of any kind; but when this is done the quality of the cement is found to be uneven, some of the layers being overburned and some underburned. It has also been found that cement made from certain layers of the stone, when allowed to set in or out of water or when made into mortar with an admixture of sand, expands and cracks, and is thus caused to be objectionable on account of such expansion; and, also, that certain layers of stone, whether overburned or underburned, produce a cement which for many kinds of work is too quick in setting.

The object of my invention is to produce an even quality of cement by subjecting it to a certain form of treatment while in the kiln, and thus freeing it from the objectionable qualities above referred to. I effect this object by injecting into the kiln, at some point between its draw-opening at the bottom and the point where the burning of the stone is effected, steam, (which may be taken from the exhaust-passage of an engine or from a generator direct,) the supply of which may be governed, according to the quality of the material being treated, by any suitable valve or cock placed in the induction-pipe. This method of treating the cement after it has fallen below the point where it has been burned, and while it is still within the kiln, has the effect of regulating the setting qualities thereof, so that the time required for it to become set can be controlled within narrow limits, and at the same time prevents the tendency of the same to swell and crack. It also has the effect to improve to some extent the tensile and transverse strength of the cement, whether used pure or mixed with sand.

For the purpose of carrying out my improved process, I have shown in the accompanying drawing one form of a kiln in which my method may be practiced.

In this drawing, A refers to a kiln commonly used for cement, which may be of any form and dimensions that will adapt it to the work to be done. This kiln is open at the top, and has a draw-opening at the bottom, where the material, when not being drawn, is supported by draw-bars.

In practice the upper portion of the kiln is filled with alternate layers of stone and coal, the stone being shown at C and the coal at D. The steam is conducted to the interior of the kiln at any desired point between the lower end thereof and the burning-point through a pipe, E, in which there is placed a valve, F, for regulating the amount allowed to enter during a given period of time.

It will be understood that I do not claim in this application the devices shown; but,

Having thus described my improved process, what I claim, and desire to secure by Letters Patent, is—

The herein-described process of treating hydraulic cement in the kiln in which it is burned, it consisting in admitting steam to the mass after it has fallen below the point where it is burned, substantially as and for the purpose set forth.

In testimony whereof I affix my signature in presence of two witnesses.

JAMES B. SPEED.

Witnesses:
W. H. MUNDY,
G. S. ADAMS.